United States Patent

[11] 3,599,429

| [72] | Inventors | Charles F. Bigelis<br>Issaquah;<br>Jeffrey L. Colehour, Bellevue; G. Dennis<br>Davidson, Mercer Island; Bannister W.<br>Farquhar, Seattle; Andreas Heiberg,<br>Renton, all of, Wash. |
|---|---|---|
| [21] | Appl. No. | 821,427 |
| [22] | Filed | May 2, 1969 |
| [45] | Patented | Aug. 17, 1971 |
| [73] | Assignee | The Boeing Company<br>Seattle, Wash. |

[54] VORTEX PREVENTING METHOD AND APPARATUS FOR AIRCRAFT JET ENGINES
3 Claims, 6 Drawing Figs.

[52] U.S. Cl. ............................................. 60/39.09 P, 244/53 B
[51] Int. Cl. ............................................. F02c 7/04, B64d 33/02
[50] Field of Search ........................................ 60/39.09, 39.09 D, 39.09 P, 226; 230/132 G, 132 S; 244/53 B, 23; 415/121, 144, 182, 219

[56] References Cited
UNITED STATES PATENTS

| 3,387,456 | 6/1968 | Feder et al. .................. | 60/34.09 DP |
| 3,527,430 | 9/1970 | Smith .......................... | 60/39.09 |

FOREIGN PATENTS

| 855,980 | 9/1957 | Great Britain ................ | 60/39.09 |

Primary Examiner—Douglas Hart
Attorneys—Glenn Orlob, Kenneth W. Thomas and Nicolaas De Vogel ABSTRACT: A method and apparatus for preventing the formation of a vortex between ground and jet engine inlet so that the problem of ingestion of foreign particles through the vortex into the engine is eliminated. The principle of operation resides in creating an artificial headwind of sufficient velocity underneath the jet engine area in order to entrain fluid flows in a direction which prevents the necessary conditions for the origin of a vortex stagnation point. An artificial headwind of sufficient velocity is created by a source of pressurized fluid connected via a conduit, extending in front of the inlet with nozzle means directed toward the area between the jet engine inlet and the ground level underneath the inlet.

INVENTORS:
CHARLES F. BIGELIS
G. DENNIS DAVIDSON
ANDREAS HEIBERG
JEFFERY L. COLEHOUR
BANNISTER W. FARQUHAR
BY
AGENT

INVENTORS:
CHARLES F. BIGELIS
G. DENNIS DAVIDSON
ANDREAS HEIBERG
JEFFERY L. COLEHOUR
BANNISTER W. FARQUHAR
BY

AGENT

VORTEX PREVENTING METHOD AND APPARATUS FOR AIRCRAFT JET ENGINES

BACKGROUND OF THE INVENTION

Field of the Invention

This invention relates to internal combustion reaction-type engines and more particularly to a means for preventing the ingestion of foreign particles into the inlet of the engine through forces caused by the existence of a vortex.

The jet engines used for the propulsion of aircraft require large quantities of air at very high-flow velocities of magnitudes from 300 feet per second and higher. It is readily apparent that small objects, such as gravel, metallic parts and other materials and debris of a similar nature are easily sucked into the high-velocity inflow of the engine and further, that as a result such foreign objects will be carried into the engine. The internal combustion reaction-type engines employ impellers and compressors for compressing, regulating, and increasing the velocity of the air and which rotate in revolutions of 10,000 or more per minute. The collision of the foreign particles with the impeller or fan blades will damage the accurately designed curvature and edges of the fan blades. As a result, an unbalanced situation and ineffective operation of the engine is enhanced.

The major cause of foreign particles being projected into the inlet flow of the reaction engine is caused by the formation of a vortex extending from the ground surface to the engine inlet.

The phenomenon of vortex formation occurs frequently in nature in various magnitudes ranging from destructive tornadoes to wandering "dust devils." The vortex which occurs beneath the inlet of a reaction-type engine is analogous to the vortex caused entirely by the forces of nature. The airflow through the engine causes a plurality of fluid flows from various directions towards the inlet, one of them being a vertical upflow of air from the ground area. The vertical upflow of air beneath the air inlet of a jet-type engine will not have the power to lift foreign particles with the exception of dust or the like. Such a condition occurs when other forces or flows interfere with the upward directed airflow, such as a slight wind or fluid flow intersecting the vertical upflow and which then can create a circulatory force. The circulatory forces are superimposed onto the vertical upflow of air from the ground and a vortex will immediately form. As is well known, the intensification of either or both the vertical upward flow of air and/or the circulatory flow thereof, will increase the magnitude and power of the vortex and resultantly increase its ability to project stones, metal particles and even larger and heavier objects upwardly into the air inlet.

The present invention solves this problem by an entirely new and different approach. The principle of operation of this invention is based on preventing the forming of the airflow condition which would create a stagnation point underneath the engine inlet area. In other words, the airstreams which normally would be drawn towards the engine inlet from an aft and underneath engine direction are replaced by airstreams which flow parallel to the engine inlet and in the same direction as the air drawn therethrough.

Heretofore, to eliminate the ingestion of particles into the inlet of the internal combustion reaction engine on aircraft, previous efforts have used four different concepts.

The first of these concepts made use of large vacuum cleaners on the runway and approaches to the airport where airplanes would operate. These vacuum cleaners would clear the path of the airplane of all debris and thus leave a clean surface with no particles to be ingested into the engine. This technique, however, is expensive because of the cost of equipment and manpower involved, and is rendered useless on unpaved or gravel runways.

The second technique to prevent ingestion of foreign particles into the inlet, utilized a filter or screen in the inlet of the engine. This technique hampered the flow of the air into the inlet and caused the engine to operate less efficiently. The adverse effect of these screens is amplified under icing conditions and can result in engine failure. Even the use of temporary screens which could be rejected after takeoff where vortex disadvantages do not exist, are objectional, since the removal of the screen dislodged the particles so that ingestion still took place. A third technique utilized jets of air located at various positions on the aircraft. The jets were positioned to impinge on the ground in front of the engine inlet, and thus blow away particles that could be ingested into the inlet. This technique also blows particles up off the surface and contributes to the ingestion of particles in some cases. This type of a technique is described in a British Pat. No. 898,417 by William Francis Wild.

The fourth technique used to control the ingestion of particles into the engine inlet consists of a jet of air blowing from beneath the engine inlet and impinging on the ground plane in front of the engine inlet near the center or core of the vortex. The flow impinging on the ground plane opposed the radial flow on the ground plane to the center of the vortex and thus, destroyed the vortex. Thus the flow hits the vortex origination center in order to blow it away which, as will be realized, is not done in the present invention explained hereinafter and which avoids on purpose to hit the stagnation point region. This method fails to function in a crosswind and also blows articles off the ground plane so that a cloud of foreign particles will whirl "in front" of the aircraft and thus will induce an ingestion via the main suction flow into the inlet. This type of technique is described in the U.S. Pat. No. 2,915,262 by Harold J. Klein.

One other technique which was tried, utilized a small tray mounted below and slightly in front of the engine 1 inlet with the obvious reason of deflecting any particles attempting to enter the engine inlet and also for the disruption of the vortex. Instead, vortices formed on each side of the tray and seemed to compound the problem.

The present invention has been tested and proven to prevent the ingestion of foreign particles into the engine inlet by causing a condition whereby a vortex cannot originate or be formed. Since it appears that the engine industry and aircraft industry have been progressing towards more power for more lift and larger airplanes and engines, the problem of foreign particle ingestion into aircraft engine inlets has been multiplied and will become more serious in the future.

It is therefore an object of the present invention to create a flow field near the air inlet of an internal combustion reaction engine so that a vortex cannot form at the air inlet for preventing ingestion of particles into the engine.

It is another object of the present invention to provide a means for creating a flow field with an air velocity which will entrain ambient air forces in one direction, thereby causing an artificial headwind condition.

It is another object of the present invention to provide an air current condition analogous to an artificial headwind condition between an engine and ground level, whereby the forces of airflow are of a magnitude and direction which oppose the forming of a vortex stagnation point underneath the engine inlet.

In general, the present invention provides for a method for preventing the forming of a vortex induced by the operation of an internal combustion reaction engine on aircraft by controlling the airflow pattern in the region between the engine and ground level, by the steps of introducing at least one fluid flow into that region, and directing the fluid flow into at least the major portion of that region in a direction substantially similar and parallel to the main airflow through the engine inlet, and of sufficient magnitude to overcome other airflows having a different direction and being present in the major portion of that region.

Furthermore, the introduction of the fluid flow in that region includes the steps of providing a source of pressurized fluid, and conducting the fluid from the source to a point ahead and below the engine inlet.

The practical process for preventing the forming of a vortex induced by the operation of an internal combustion reaction engine on aircraft by controlling the airflow pattern in the region between the engine and ground level is accomplished by distracting a flow of high-pressurized fluid from the engine, thereafter conducting the high-pressurized fluid to one point forward and below the engine inlet and then by releasing the flow from said point in a controlled direction and magnitude into at least the major portion of that region in a d direction and magnitude into at least the major portion of that region in a direction substantially similar and parallel to the main airflow through the engine inlet, and of sufficient magnitude to overcome other airflows having a different direction and being present in said major portion of the region.

The apparatus for preventing the forming of a vortex induced by the operation of an internal combustion reaction engine on aircraft by controlling the airflow pattern in the region between the engine and ground level comprises in general, a high-pressure fluid source and means connected to the source for conducting the high-pressure fluid to a point outward and substantially ahead of an below the engine through the use of exit means connected to the conducting means for releasing the high-pressurized fluid in a predetermined direction.

The complete configuration of the apparatus for preventing the forming of a vortex as mentioned above may include means to regulate, control and direct the exit means or nozzle direction and the quantity of high-pressurized fluid released thereby and furthermore may encompass folding-in features for the outwardly protruding components with actuating means employed for operating said folding-in mechanism.

A fuller understanding of the invention will be obtained from a knowledge of the accompanying drawings and description showing the preferred embodiments thereof.

DESCRIPTION OF THE INVENTION

Figure 1:
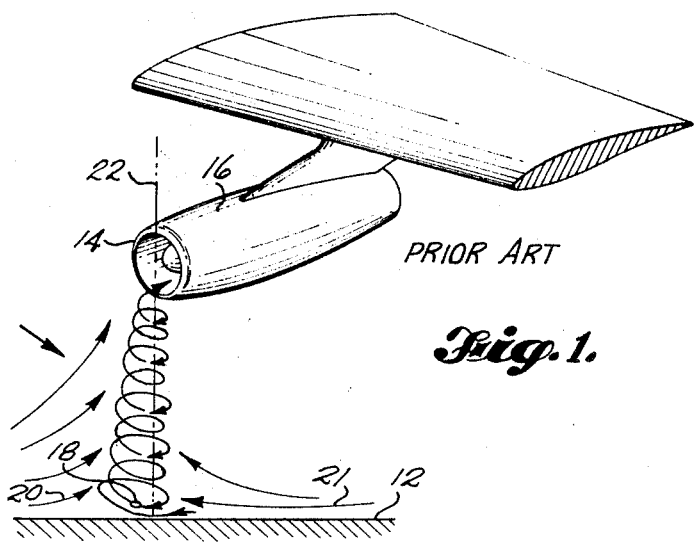
FIG. 1 is a perspective view of a jet engine supported by and below the wing. Between the engine air inlet and the ground level a vortex is shown to be in existence.
Figure 2:
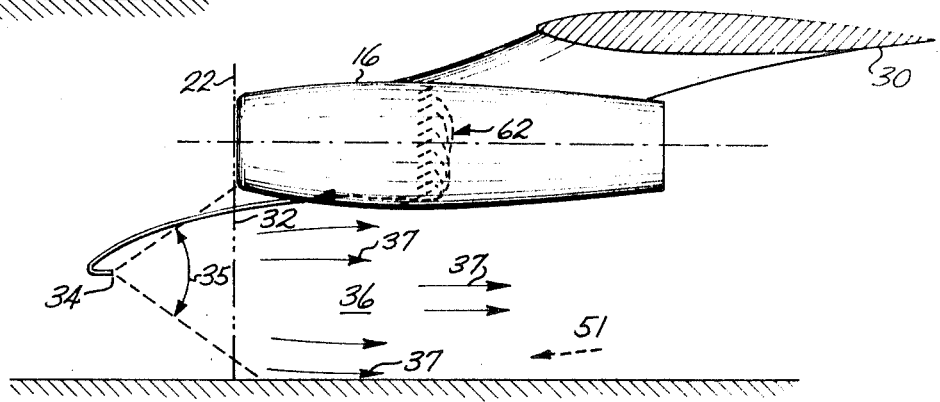
FIG. 2 is a side elevation view of a jet engine supported by and below the wing of an aircraft employing the preferred embodiment of the present invention solving the problem theoretically.

As discussed above, the forming of the vortex induced by the operation of the jet engine is symbolically illustrated through force lines or arrows in FIG. 1. The vortex 10 which can form at the ground plane 12 is shown to extend upwards into the inlet 14 of an internal combustion reaction engine 16. The vortex stagnation point 18 which is indirectly created by the opposing airflows 20 and 21 is normally positioned slightly above the ground level 12, as illustrated. This point 18 or center of vortex origination is normally positioned about 9 inches forward of the imaginary reference line 22. This line is substantially perpendicular from the ground level 12 and coincident with the vertical plane of the intake circumference. It is a fact, however, that the vortex stagnation point is mostly wandering under normal condition between about 6 to 12 inches forward of said reference line 22, as illustrated in FIGS. 1 and 2. As explained, when a vortex is formed, the lifting force of a vortex 10 is amplified by an increase of radial or circular vortex flow through associated disturbances, such as wind or other jet airplane engine operations in the adjacent area and also, by the increase of r.p.m. of the engine 16.

Referring to FIG. 2, the same jet engine 16 underneath the wing 30 is illustrated employing a forward extending conduit 32, which is connected internally to a fluid pressure source in the engine 16. The conduit 32 is provided with a nozzle 34 which is directed to an area underneath the engine 16, which area is the region 36 being covered for its major portion by the airstream 35 creating a headwind condition indicated by arrows 37. A fan-shaped airstream 35 leaves the nozzle 34. It should be realized that the angles shown can be varied to different values. The shape of the airflow leaving the nozzle 34 may also be changed at command so that the desired air velocity and area 36 covered, would be obtained.

Figure 3:
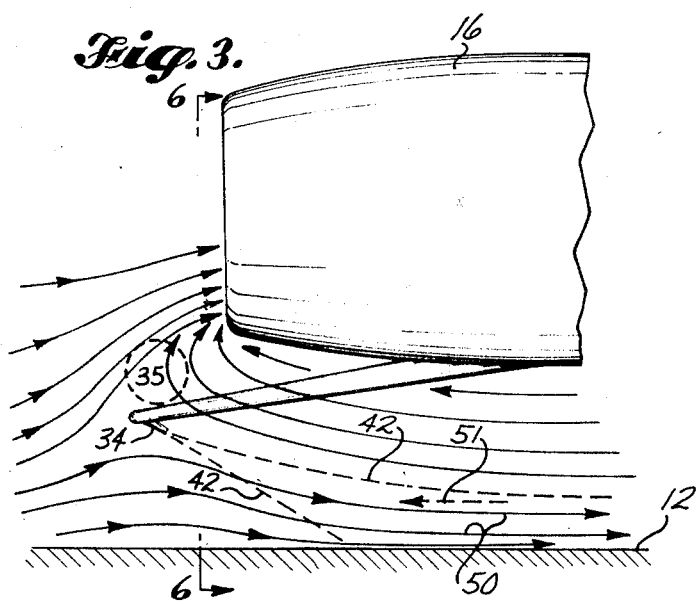
FIG. 3 is a side elevation view of a jet engine supported by and below the wing of an aircraft employing the actual apparatus used in aircraft and considered to be the preferred practical embodiment of this invention which is used as such on airplanes today proving to be successful.
Figure 4:
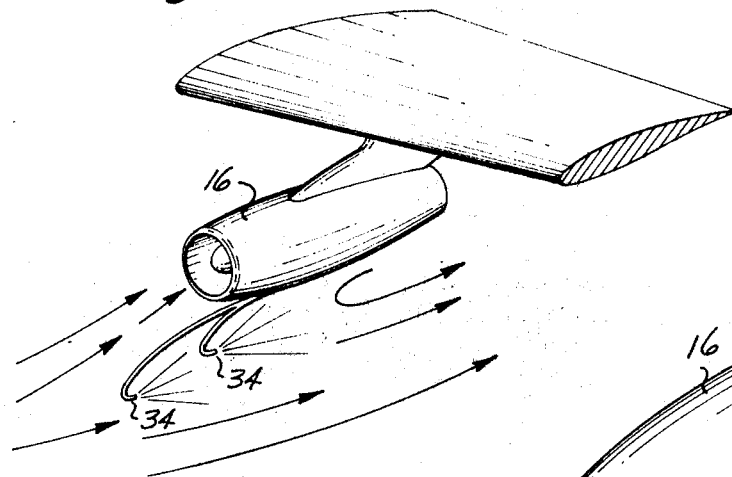
FIG. 4 is an alternate embodiment of the present invention illustrating a perspective view of a jet engine supported by and below the wing of an aircraft having a plurality of vortex preventing means.

In FIG. 3 the conduit 32 expels a fan-shaped stream of air 42 or jetstream which entrains the ambient air between ground level and about ½ distance from the engine into the direction as shown by the arrows 50. In FIG. 2 the jetstream 42 redirects the entire layer of air between the engine 16 and ground level while in FIG. 3 part of the air layer from ground level 12 upwards is redirected. Previously, with the apparatus of the present invention, the air was moving in an opposed direction towards the air sink or engine inlet 14 and would create a singularity or stagnation point 18 on the ground where aft flow 21 would meet forward flow 20. Thus, as shown in FIGS. 2, 3 and 4, the airjet flows create a smooth continuation of flow aft or in the region below the engine and below the nozzle 34. An eventual singularity 35 may still be formed in FIG. 3 directly underneath the inlet. However, since this small vortex 35 is next to the inlet or above the shear layer of the jet or airflow 42 from nozzle 34, this vortex would be harmless because the connection to the ground is broken and thus debris cannot be picked up.

It has been calculated that the jet mass flow from the nozzle 34, required to dissipate vortices, is in the order of one-third of one percent of total inlet mass flow to the jet engine 16 and that the efficiency will improve by subdividing the flow into three multiple jets directing parallel with the main intake air through the engine which normally is coincident with the longitudinal center axis of the engine 16.

It should be added that a plurality of conduits might be necessary in cases where the engine is higher above ground and where the engine power performance is relatively high. A typical example would be on airplanes such as the 747 or C5A. It will be practically impossible to cover the distance between ground level and engine with one airstream delivering the required air quantity and velocity in a schematic block form. However, in both FIGS. 2 and 4 the reversed airflow 51 as shown by symbolic force line 21 in FIG. 1 does not exist. Thus, a condition is created where a vortex development cannot be originated or formed, since all the air or fluid streams are directed towards the rear of the engine. In other words, an artificial headwind between the engine and ground level has been made.

It will be obvious that the jet- or fan-shaped stream delivered from the nozzles 34 as shown in FIGS. 3 and 4 may be located at any height forward of the engine, between the ground plane and the inlet of the engine, and also that the distance forward of the engine inlet is determined by the length of the conduit 32 which also can be varied to the most desirable position. It should be stated however that the most efficient positioning for 737 airplanes (Boeing) has been found by actual tryout wherein over 1,500 various positions in regard to nozzle distance, nozzle flow, multitude of nozzles, etc. have been tested.

Figure 5:
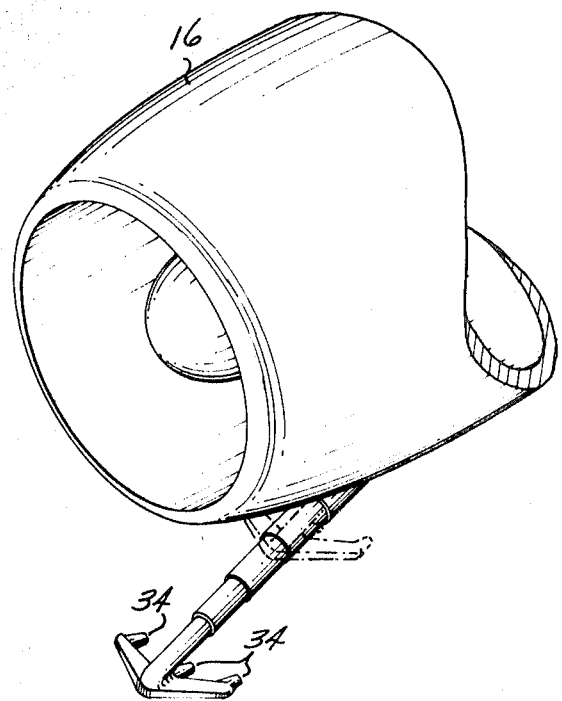
FIG. 5 shows a mechanical diagram of the present vortex apparatus to be used on aircraft and provided with a telescoping fold-away mechanism, and three nozzles directed to cover a sufficient area with fluid flow.

Thus a boom 32 sticking out 9 inches forward of line 22 with 3 nozzles directed substantially as shown, appeared to be most efficient. In the execution of this invention a general objection and complaint by the airlines operating the airplane was introduced, namely the extending structure of conduit 32 which can be easily damaged and forms an obstacle during ground handling. For this reason a telescoping or folding-in structure 60 has been illustrated in FIG. 5 which is connected to a pressure source 62 in the engine 16. Of course, an outside air pressure source can be used, however, since the vortex problem arises during takeoff, approach and standstill of the airplane while the engines are operating and thus form an air sink close to the ground level, it is most efficient to use the already available high-pressurized fluid source 62 (schematically shown) close at hand in the engine itself. For instance, a source of high-pressurized air can be obtained readily from one or more stages of the compressor of the engine 16.

Figure 6:
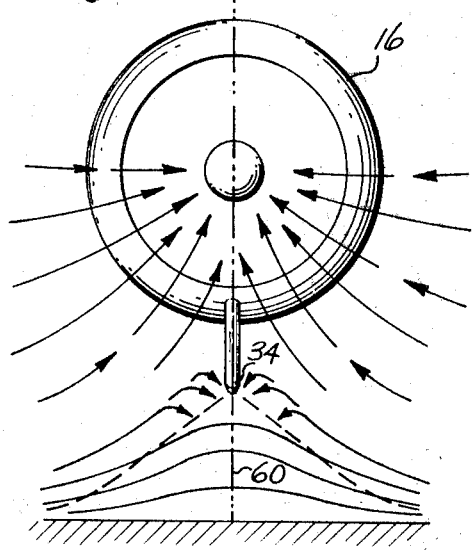
FIG. 6 is a sectional view taken from FIG. 3 along line 6-6.

The area covered by the airflow leaving the nozzle 34 has an approximate cross-sectional appearance as illustrated in FIG. 6. As shown, most of the air is used directly underneath the engine 16 while tapering to less air towards the left or the right side away from the vertical center axis 60 of the engine 16.

Although only the most preferred embodiments have been shown herein, it should be apparent that many other arrangements may be adopted which teach the same principle of operation of this invention, namely to prevent a vortex from forming by creating an artificial headwind condition for a region near the engine which then becomes impotent for the genesis of a vortex.

Thus, in accordance with the provisions of the patent statutes, the principle and operation of our invention is herein described and it should be understood that the invention is susceptible to insignificant structural changes not limited to the preferred embodiments as illustrated herein.

We claim:

1. A method for preventing aircraft engine inlet ingestion of solid particles pulled by vortex action through eliminating the forming of the vortex by the steps of:
    a. introducing at least one fluid flow into the region between the engine and ground level, and
    b. directing the fluid flow into said region in about the same direction as the main airflow through the engine inlet from a point ahead of and below said inlet and of sufficient magnitude to reduce other airflows having a different direction and being present in said region.

2. A method for preventing aircraft engine inlet ingestion of solid particles pulled by vortex action through eliminating the forming of the vortex by the steps of:
    a. distracting a flow of high-pressurized fluid from the engine,
    b. conducting the high-pressurzed fluid to a point forward and below said engine inlet, and
    c. releasing the flow from said point in a controlled direction and magnitude into at least the lower horizontal portion of said region in a fan-shaped direction substantially parallel to the main airflow through the engine inlet and of sufficient magnitude to reduce other airflows having a substantially opposed direction and being present in said portion of said region.

3. A method as claimed in claim 2 wherein said releasing of said fan-shaped flow intersects said ground level at a location approximately underneath said inlet.